US012769024B2

(12) United States Patent
Utsuzawa et al.

(10) Patent No.: US 12,769,024 B2
(45) Date of Patent: Oct. 20, 2026

(54) METHODS FOR ESTIMATING NMR LWD DATA QUALITY

(71) Applicant: Schlumberger Technology Corporation, Sugar Land, TX (US)

(72) Inventors: Shin Utsuzawa, Sugar Land, TX (US); Wei Chen, Houston, TX (US); Marie Van Steene, Dhahran (SA); Yuelin Shen, Spring, TX (US); Albina Mutina, Clamart (FR); Lukasz Zielinski, Arlington, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 412 days.

(21) Appl. No.: 18/565,609

(22) PCT Filed: Jun. 2, 2022

(86) PCT No.: PCT/US2022/031961
§ 371 (c)(1),
(2) Date: Nov. 30, 2023

(87) PCT Pub. No.: WO2022/256527
PCT Pub. Date: Dec. 8, 2022

(65) Prior Publication Data

US 2024/0248232 A1 Jul. 25, 2024

Related U.S. Application Data

(60) Provisional application No. 63/196,352, filed on Jun. 3, 2021.

(51) Int. Cl.

| | |
|---|---|
| ***G01V 3/38*** | (2006.01) |
| ***E21B 44/00*** | (2006.01) |
| ***G01V 3/32*** | (2006.01) |

(52) U.S. Cl.
CPC ................ *G01V 3/38* (2013.01); *E21B 44/00* (2013.01); *G01V 3/32* (2013.01); *E21B 2200/20* (2020.05); *E21B 2200/22* (2020.05)

(58) Field of Classification Search
CPC .. G01V 3/38; G01V 3/32; E21B 44/00; E21B 2200/20; E21B 2200/22; G06N 20/00
See application file for complete search history.

(56) References Cited

U.S. PATENT DOCUMENTS 6,140,817 A 10/2000 Flaum
6,179,066 B1 * 1/2001 Nasr .................. E21B 17/1064 175/45

(Continued)

FOREIGN PATENT DOCUMENTS

WO WO-2017083060 A1 * 5/2017 ............... G01V 3/32

OTHER PUBLICATIONS

International Search Report and Written Opinion issued in International Patent application PCT/US2022/031961 on Sep. 19, 2022, 10 pages.

*Primary Examiner* — Mohammad K Islam
(74) *Attorney, Agent, or Firm* — Jeffrey D. Frantz

(57) ABSTRACT

A method is provided for evaluating logging while drilling (LWD) nuclear magnetic resonance (NMR) measurement quality. The method may include rotating a bottom hole assembly (BHA) in a wellbore to drill. The BHA may include an NMR tool deployed at a first location and at least one motion sensor deployed at a second location, wherein the first and second locations are axially spaced apart in the BHA. The method may also include making NMR measurements and corresponding motion sensor measurements while drilling in the wellbore. The method may further (Continued)

include processing the motion sensor measurements to determine the NMR measurement quality of the corresponding NMR measurements.

19 Claims, 8 Drawing Sheets

(56) References Cited

U.S. PATENT DOCUMENTS

| | | | | |
|---|---|---|---|---|
| 9,575,204 | B2 * | 2/2017 | Chen | G01V 3/32 |
| 2001/0043066 | A1 | 11/2001 | Hawkes | |
| 2001/0045829 | A1 | 11/2001 | Prammer | |
| 2004/0196038 | A1 | 10/2004 | Kruspe | |
| 2007/0144782 | A1 | 6/2007 | Krueger | |
| 2008/0164025 | A1 * | 7/2008 | Peter | E21B 47/002 166/255.2 |
| 2010/0126717 | A1 * | 5/2010 | Kuchuk | E21B 49/008 166/250.03 |
| 2014/0172306 | A1 * | 6/2014 | Brannigan | E21B 47/12 702/6 |
| 2016/0202384 | A1 * | 7/2016 | Utsuzawa | E21B 47/024 324/303 |
| 2019/0056524 | A1 | 2/2019 | Reiderman | |
| 2019/0164524 | A1 | 5/2019 | Soni | |
| 2020/0291763 | A1 | 9/2020 | Utsuzawa | |
| 2020/0333501 | A1 * | 10/2020 | Miller | G01R 33/448 |
| 2021/0063600 | A1 | 3/2021 | Li | |
| 2021/0190989 | A1 * | 6/2021 | Cheng | E21B 47/00 |
| 2022/0187489 | A1 * | 6/2022 | Yang | E21B 44/00 |
| 2022/0260746 | A1 * | 8/2022 | Al-Malki | G01V 5/045 |
| 2023/0132749 | A1 | 5/2023 | Thomas | |

* cited by examiner

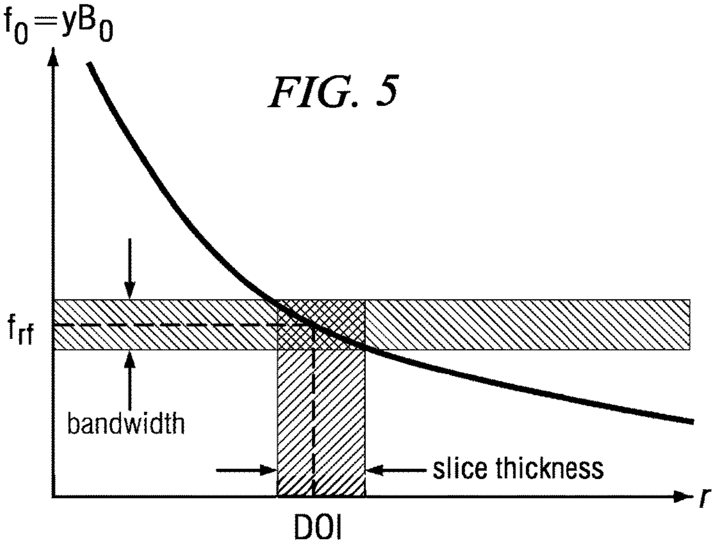
FIG. 5
FIG. 6
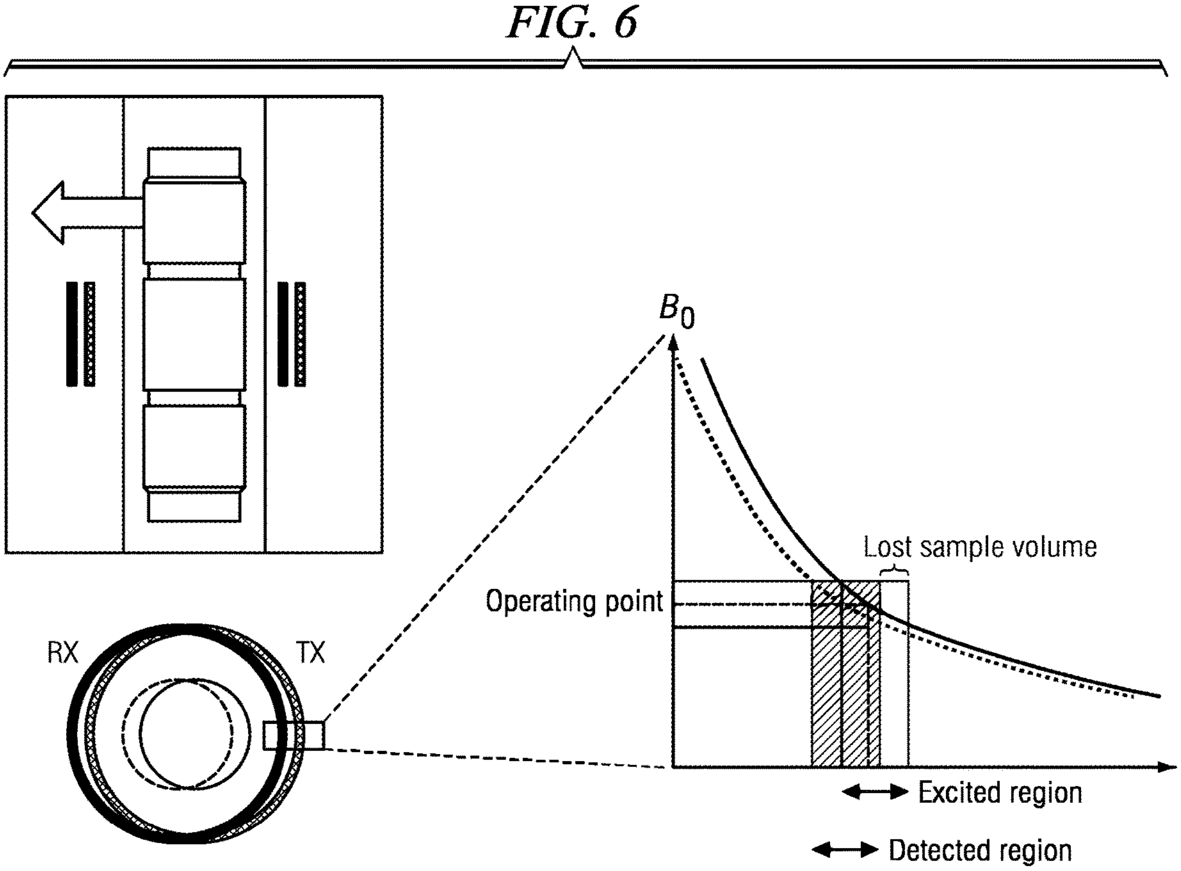

Azimuthally uniform $B_0$

Azimuthally non-uniform $B_0$

METHODS FOR ESTIMATING NMR LWD DATA QUALITY

CROSS REFERENCE TO RELATED APPLICATIONS

This application is a National Stage Entry of International Application No. PCT/US2022/031961, filed Jun. 2, 2022, which claims priority to and the benefit of U.S. Provisional Application No. 63/196,352, filed Jun. 3, 2021, which is incorporated by reference herein in its entirety.

BACKGROUND

This section is intended to provide the reader with background information to facilitate a better understanding of the various aspects of the present disclosure. Accordingly, it should be understood that these statements are to be read in this light, not as admissions of prior art.

The desire for real-time or near real-time information while drilling a wellbore gave rise to measurement-while-drilling (MWD) tools and logging-while-drilling (LWD) tools. MWD tools may provide drilling parameter information such as weight-on-bit, torque, shock and vibration, temperature, pressure, rotations-per-minute (rpm), mud flow rate, direction, and inclination. LWD tools may provide formation evaluation measurements such as natural or spectral gamma-ray, resistivity, dielectric, sonic velocity, density, photoelectric factor, neutron porosity, sigma thermal neutron capture cross-section, a variety of neutron induced gamma-ray spectra, NMR $T_1$ and $T_2$ distributions, and porosity.

Common logging tools include electromagnetic tools, acoustic tools, nuclear tools, and nuclear magnetic resonance (NMR) tools, though various other tool types are also used. NMR instruments can be used to determine properties of earth formations, such as the fractional volume of pore space, the fractional volume of mobile fluid filling the pore space, and the porosity of earth formations. NMR data may also be used to assess the content of brine and hydrocarbons in the formation. General background of NMR well logging is described in commonly assigned U.S. Pat. No. 6,140,817.

The signals measured by NMR logging tools typically arise from the selected nuclei present in the probed volume. Because hydrogen nuclei are the most abundant and easily detectable, most NMR logging tools are tuned to detect hydrogen resonance signals (from either water or hydrocarbons). The dynamic properties (e.g., diffusion rate and tumbling/rotation rate) of these hydrogen nuclei depend on the local environment such as the chemical structure and size of the molecules in which the nuclei reside. The dynamic properties of the nuclei manifest themselves in different nuclear spin relaxation times (e.g., spin-lattice relaxation time ($T_1$) and spin-spin relaxation time ($T_2$) in which spin-lattice relaxation is also referred to as longitudinal relaxation and spin-spin relaxation as transverse relaxation). For example, molecules in viscous oils cannot diffuse or tumble as fast as those in light oils. As a result, they have relatively short relaxation times. These observations suggest that NMR data (e.g., relaxation times) can provide information on molecular properties of hydrocarbons in the earth formations.

NMR measurements are commonly made while drilling. One difficulty with making and interpreting LWD NMR measurements is that motion of the NMR tool can influence the measurements. For example, excessive tool motion can introduce additional signal decay which in turn introduces errors into the NMR measurements.

BRIEF DESCRIPTION OF THE DRAWINGS

For a more complete understanding of the disclosed subject matter, and advantages thereof, reference is now made to the following descriptions taken in conjunction with the accompanying drawings, in which:

FIG. 5 depicts a plot of frequency versus lateral distance showing the sensitive volume as a function of frequency.

FIG. 6 schematically depicts an LWD NMR tool configuration located in a borehole and illustrating lateral tool motion.

DETAILED DESCRIPTION

Disclosed embodiments relate generally to downhole NMR measurement methods and downhole NMR tools (e.g., NMR logging while drilling tools) used in making such measurements. A disclosed method for evaluating logging while drilling (LWD) nuclear magnetic resonance (NMR) measurement quality includes rotating a bottom hole assembly (BHA) in a wellbore to drill. The BHA includes an NMR tool (or sensor) axially spaced apart from at least one motion sensor. NMR measurements and corresponding motion sensor measurements are made while drilling. The motion sensor measurements are processed to determine the NMR measurement quality of the corresponding NMR measurements.

In certain embodiments a correlation is developed relating motion at the motion sensor and the NMR measurement quality. In some embodiments, the motion measurements at the motion sensor are processed to determine motion at the NMR sensor which is then further processed to determine the NMR measurement quality.

The disclosed embodiments may advantageously enable the effect of drilling motion on NMR measurements to be quickly identified and mitigated. For example, upon identifying problematic drilling dynamics that lead to poor NMR data quality, the drilling parameters (e.g., WOB and surface RPM) may be changed and/or additional NMR data may be collected in an affected zone (e.g., while tripping the drill string out of the wellbore).

The disclosed embodiments are further intended to account for differences in BHA motion at the motion sensor and the NMR tool and may therefore provide a more realistic indication of NMR measurement quality. Moreover, certain of the disclosed embodiments may enable complex drilling dynamics including numerous modes of motion to be correlated with the NMR measurement quality. The disclosed embodiments may therefore provide an improved indication of NMR measurement quality.

Figure 1:
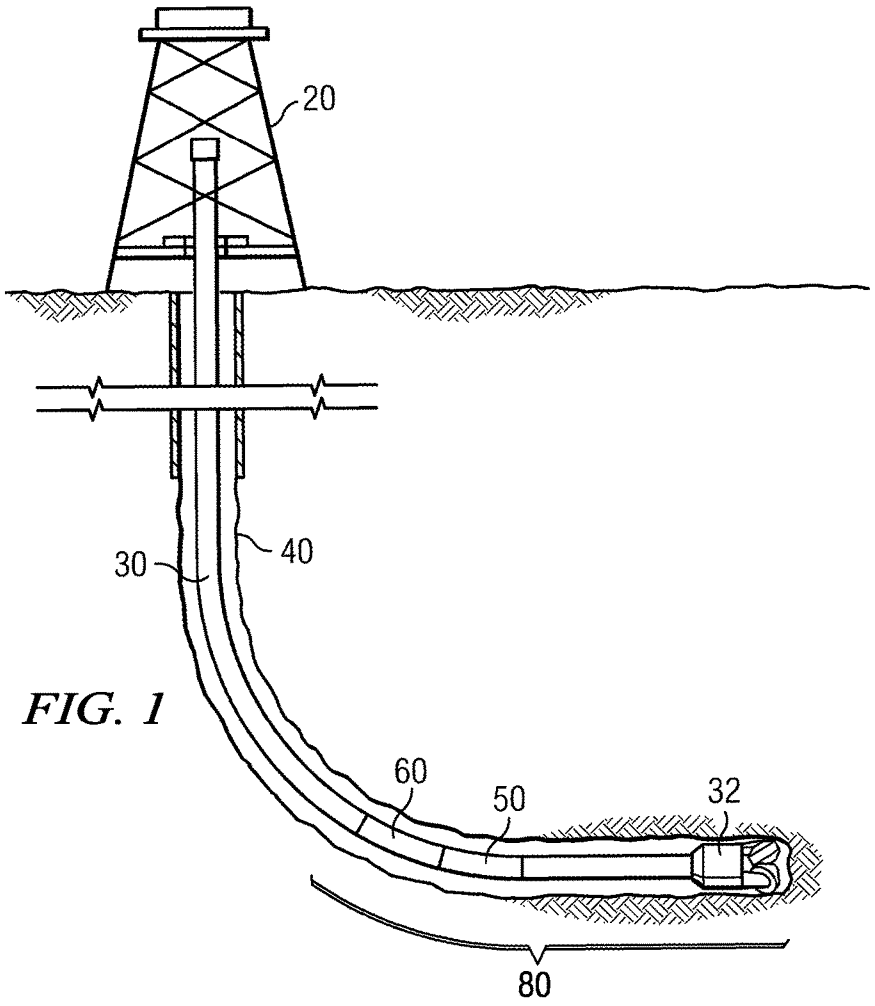
FIG. 1 depicts an example drilling system incorporating a disclosed NMR logging embodiment.

FIG. 1 depicts a schematic drilling rig 20 including a drill string 30 and an NMR logging tool 50 deployed in the string and disposed within a wellbore 40. The drilling rig 20 may be deployed in either onshore or offshore applications (an onshore application is depicted). In this type of system, the wellbore 40 may be formed in subsurface formations by rotary drilling in a manner that is well-known to those or ordinary skill in the art (e.g., via well-known directional drilling techniques).

As is known to those of ordinary skill, the drill string 30 may be rotated, for example, at the surface to drill the well (e.g., via a rotary table). A pump may deliver drilling fluid to the interior of the drill string 30 thereby causing the drilling fluid to flow downwardly through the drill string 30. The drilling fluid exits the drill string 30 via ports in a drill bit 32, and then circulates upwardly through the annulus region between the outside of the drill string 30 and the wall of the wellbore 40. In this known manner, the drilling fluid lubricates the drill bit 32 and carries formation cuttings up to the surface.

In the illustrated embodiment, the NMR logging tool may be deployed in a bottom hole assembly (BHA) 80, including for example, a rotary steerable system (RSS), a motor, drill bit 32, a measurement while drilling (MWD) tool 60, and/or one or more other logging-while-drilling (LWD) tools. The LWD tools may be configured to measure one or more properties of the formation through which the wellbore penetrates, for example, including resistivity, density, porosity, sonic velocity, gamma ray counts, and the like. The MWD tool 60 may be configured to measure one or more properties of the wellbore 40 as the wellbore as it is drilled or at any time thereafter. The physical properties may include pressure, temperature, wellbore caliper, wellbore trajectory (attitude), and the like.

The MWD tool 60 may be further configured to measure drill string dynamics (e.g., motion and acceleration) while drilling and may therefore include substantially any number of accelerometers, magnetometers, gyroscopic sensors, strain gauges, and the like. These sensors may be arranged, for example, to measure substantially any number and type of drill string dynamics indicators, for example, including axial and transverse shock, axial and transverse acceleration, radial acceleration, tangential acceleration, downhole rotation rate, weight on bit, torque on bit, axial and transverse bending, and axial and transverse magnet field, bit bounce severity, stick slip severity, a bending moment of the BHA, and various other indicators of drilling string displacement, velocity, and acceleration while drilling (drilling dynamics). It will of course be understood that such dynamics sensors are not necessarily deployed in an MWD tool, but may be deployed in substantially any suitable location (or locations) in the BHA.

With continued reference to FIG. 1, the NMR logging tool 50 may include a detection coil (commonly referred to as an antenna) that may measure the properties of nuclear spins in the formation, such as the longitudinal (or spin-lattice) relaxation time $T_1$, transverse (or spin-spin) relaxation time $T_2$, and a diffusion coefficient D. Knowledge of these NMR properties may help aid in the determination of basic formation properties such as permeability and porosity, as well as the fluid properties such as fluid type and viscosity. Multi-dimensional NMR techniques may provide quantitative fractions of different fluids (e.g., oil, water, gas) and a better understanding of the diffusion properties of these fluids in the surrounding formation, including the effects of geometry and restricted diffusion.

As is known to those of ordinary skill in the art, NMR well logging includes generating a static magnetic field (the $B_0$ field) within a wellbore (e.g., under the earth's surface), applying a series of radio frequency (RF) electromagnetic pulses to the volume around the borehole (the $B_1$ field), measuring signals (echoes) received in response to the RF pulses, and processing the received echoes to determine characteristics of the volume in proximity to the borehole. Conventional characteristics of the volume measured during NMR well logging include $T_1$ and $T_2$, as well as diffusion coefficients D of the fluid inside the volume. In addition to these one-dimensional (1D) measurements of relaxation times and diffusion coefficients, NMR logs may also provide two-dimensional (2D) maps showing the correlation between diffusion and relaxation times (e.g., D-$T_1$ or D-$T_2$ maps) and the correlation between longitudinal and transverse relaxation times (e.g., $T_1$-$T_2$ maps). These maps may be used to determine formation properties, such as porosity and permeability, as well as fluid properties such as the saturation of oil, water and gas. These 2D maps often enable water, gas, and oil signals to be distinguished, which may enable saturation determinations. Moreover, evaluating the position of the oil signal on the map, may enable the viscosity of the oil to be estimated from various correlations to logarithmic mean relaxation times.

As described above, NMR measurements involve the application of a $B_0$ magnetic field to the magnetic moments (spins) of atoms in the measured object (or measured volume). In general, the $B_0$ field causes the atoms in the interrogated volume to align along and oscillate (precess) about the axis of the applied magnetic field. NMR measures the return to the equilibrium of this magnetization (i.e., relaxation) after applying a series of RF pulses to tip the magnetization in a direction orthogonal to the applied magnetic field. Longitudinal relaxation due to energy exchange between the spins of the atoms and the surrounding lattice (spin-lattice relaxation) is usually denoted by a time $T_1$ when the longitudinal magnetization has returned to a predetermined percentage (i.e., 63%) of its final value. Longitudinal relaxation involves the component of the spin parallel or anti-parallel to the direction of the magnetic field. Transverse relaxation that results from spins getting out of phase is usually denoted by time $T_2$ when the transverse magnetization has lost a predetermined percentage (i.e., 63%) of its original value.

In oilfield applications, NMR relaxation, such as measured by $T_2$, may be directly proportional to the surface-to-volume ratio of a porous material, for example, as expressed below:

$$\frac{1}{T_n} = \rho_n \cdot \frac{S}{V_p} + \frac{1}{T_{nb}} \tag{1}$$

where S represents the total surface area of the material, $V_p$ represents the pore volume, $\beta_n$ represents the surface relaxivity, $T_{nb}$ represents the bulk relaxation time, and n=1 or 2 denoting the correspondence with $T_1$ or $T_2$. It will be understood that Equation 1 ignores a diffusion contribution which is generally a weak effect in most short echo spacing NMR measurements used downhole. The surface relaxivity p is a quantity that defines the strength of the surface relaxation phenomenon and is generally given in units of length (e.g., microns). The relationship given in Equation 1 is one reason that NMR measurements are used extensively in petroleum exploration to obtain estimates of porosity, pore size, bound fluids, permeability, and other rock and fluid properties (i.e., what is commonly referred to as petro-physical data).

Reservoir rocks often exhibit a wide range of $T_2$ values owing to the different pore sizes in the rock. Observed $T_2$ values commonly range from several seconds down to tens of microseconds. Signals at long $T_2$ (e.g., >100 milliseconds) tend to be from fluids in large pores, which are often considered to be producible. At $T_2$ values (e.g., 3-50 milliseconds) the fluids are sometimes considered to be bound by capillary force of the pores. For example, in sandstone rocks, $T_2$ is commonly less than 30 milliseconds and the fluids tend not to produce. Signals with even lower $T_2$ values, such as $T_2$<3 ms, may result from clay bound water or viscous (heavy) hydrocarbon. Some rocks contain a significant amount of kerogen that is solid organic matter and may exhibit $T_2$ values as low as tens of microseconds.

The porosity of a formation may be estimated from NMR measurements, for example, as follows:

$$\Phi = \int_{T_{2min}}^{T_{2max}} f(T_2)dT_2 \tag{2}$$

where $\phi$ represents the porosity, f ($T_2$) represents a distribution of $T_2$ values obtained for a fully saturated sample (referred to as the $T_2$ distribution), and $T_{2max}$ and $T_{2min}$, represent the maximum and minimum $T_2$ values in the $T_2$ distribution. As noted above, obtaining an accurate estimation of $T_2$ and porosity is a commercially important indication of the producibility of the fluids in a subterranean formation (e.g., as described above with respect to Equations 1 and 2).

Figure 2:
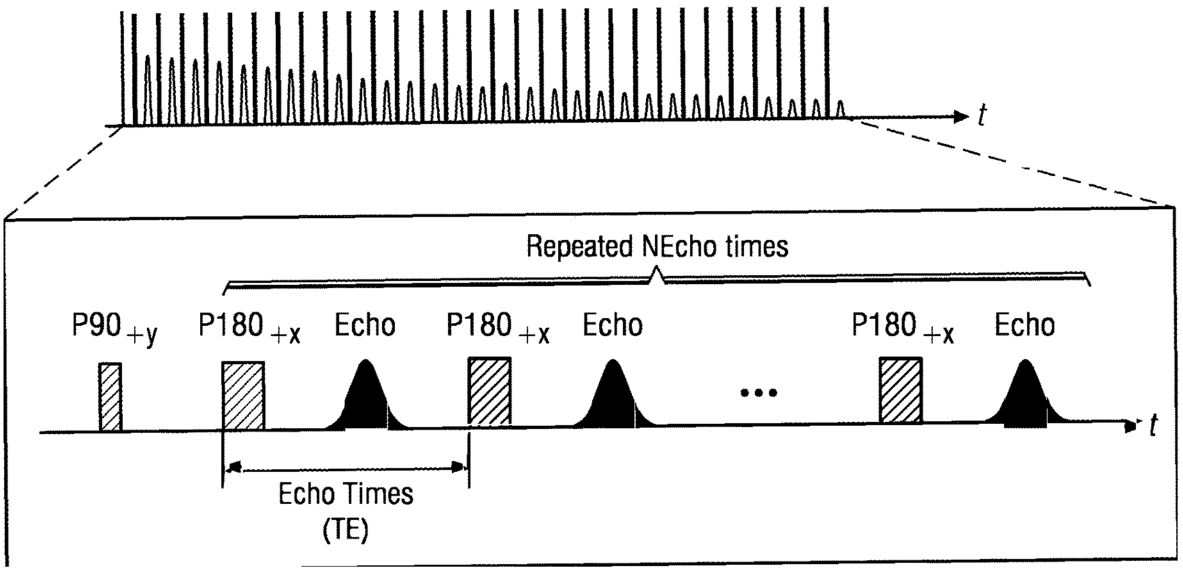
FIG. 2 depicts an example NMR pulse sequence.
Figure 3:
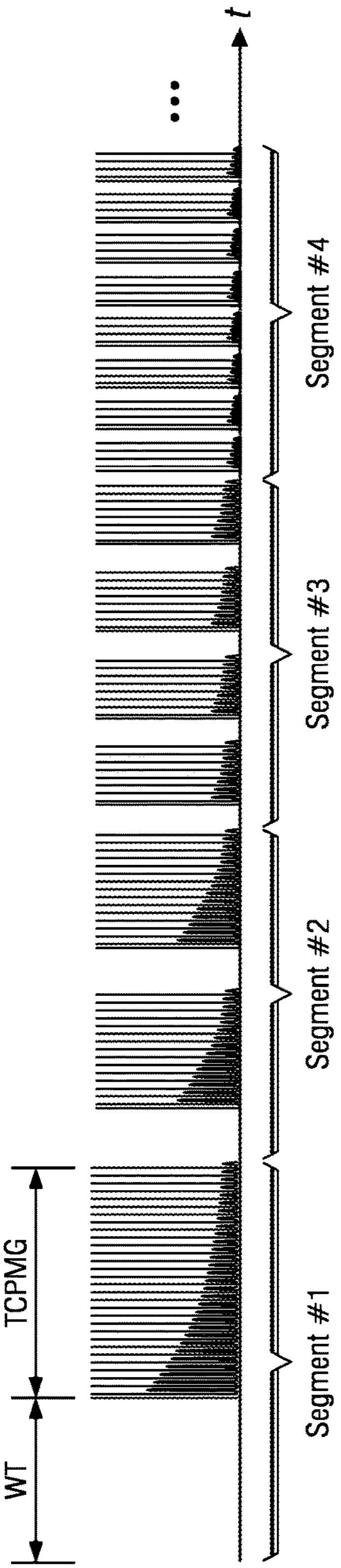
FIG. 3 depicts another example NMR pulse sequence.

NMR measurements may be acquired using particular data acquisition schemes (commonly referred to as pulses or pulse sequences) which describe the timings of transmission and reception of electromagnetic (RF) signals. A Carr-Purcell-Meiboom-Gill (CPMG) pulse sequence is commonly used to make downhole NMR measurements (e.g., to acquire the $T_2$ relaxation time distribution). As depicted in FIGS. 2 and 3, a CPMG pulse sequence (also referred to herein as an echo train) includes an initial idle time or wait time WT to allow the nuclei in the formation fluids to equilibrate with the $B_0$ field induced, for example, by a permanent magnet in the logging tool. Thereafter, a series of radio-frequency pulses are applied using an antenna. Midway between adjacent pulses, NMR signals called echoes are formed and measured using the antenna (with the number of acquired echoes being represented by NEcho). The time spacing between adjacent refocusing pulses is referred to as TE and the time spacing between the excitation pulse and the first refocusing pulse is commonly set to TE/2. The amplitude of the echoes decays or attenuates with time. By fitting the echo amplitudes to a multi-exponential model, the $T_2$ relaxation time distribution may be obtained.

FIG. 3 depicts a common $T_1$-$T_2$ sequence that measures $T_1$-$T_2$ correlation spectrum and includes of a series of CPMG sequences with different WT, NEcho, and TE intended to make measurements over a wide range of sample properties (as is commonly found in subterranean formations). The echo train having a long WT may have sensitivity to long $T_1$-$T_2$ components but is often executed only once (or a few times) owing to the inherently longer measurement time. The echo trains having short WT are often executed multiple times to ensure enough sensitivity to short $T_1$ and short $T_2$. In addition, short echo trains often use a short TE to capture short $T_2$ components that decay quickly.

Figure 4:
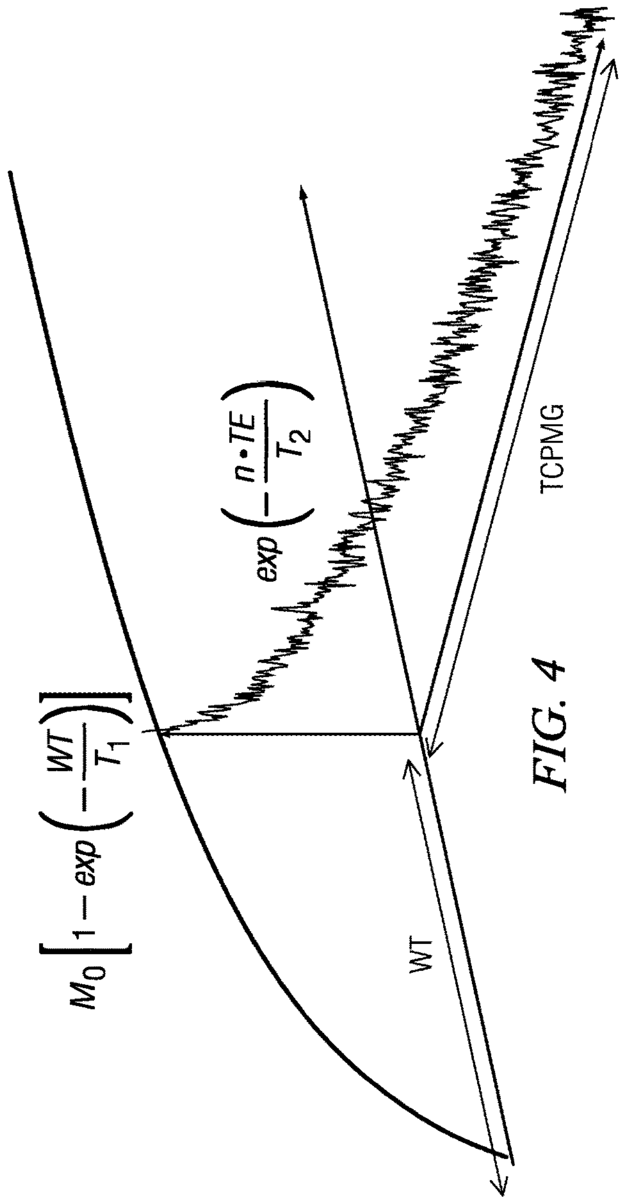
FIG. 4 depicts an example NMR signal obtained using the pulse sequence of FIG. 3.

FIG. 4 depicts a diagram (or a plot) of an NMR signal obtained using a pulse sequence such as that depicted on FIG. 3. NMR measurements that make use of multiple CPMG pulse sequences may be characterized, for example, by following equation:

$$M(t = n \cdot TE) = M_0\left[1 - \exp\left(-\frac{WT}{T_1}\right)\right]\exp\left(-\frac{n \cdot TE}{T_2}\right) \tag{3}$$

where $M_0$ represents the magnetization in thermal equilibrium and for a unit volume as follows: $M_0=(\chi/\mu_0)B_0$, $\chi$ represents the nuclear magnetic susceptibility, $\mu_0$ represents the magnetic permeability of free space, and $B_0$ represents the amplitude of the static magnetic field applied by the tool to the sample (e.g., by permanent magnets). The $T_1$ and $T_2$ relaxation times may be obtained, for example, by fitting equation 3 to a two-dimensional CPMG dataset (a set of measured echo amplitudes) obtained with known WT and TE. If a sample is heterogeneous (as is often found in well logging), Equation 3 may be described by distributions of $T_1$ and $T_2$.

Equation 3 (as expressed above) is valid under the assumption that the NMR logging tool is either static (stationary) in the wellbore or is moving at a negligible speed when the measurements are made. In such scenarios, the tool displacement may be thought of as being much less than the size (or dimension) of the sensitive volume (or region) along the direction of motion during execution of the CPMG pulse sequence. In practice however, excessive tool motion (e.g., axial, lateral, rotational, or combinations thereof) may modify the spin physics of the NMR measurement. If not properly considered, such motion effects may severely impact both measurement quality and the accuracy of interpretation. Given that NMR logging measurements are commonly made in dynamic conditions (e.g., while drilling in which the tool moves in the wellbore), the present inventors recognized the need for improved logging methods that, in some embodiments, predict and account for such tool motion.

As noted above, NMR logging tools commonly include a permanent magnet (or magnets) and an antenna (or antennas) to project $B_0$ and $B_1$ fields into the formation. The magnetic fields produced by these sensors are commonly (and in many cases inherently) inhomogeneous owing to the inside out structure of the downhole NMR tool. In such tools the sensitive region is determined by the resonance frequency of nuclear spins and the bandwidth of the excitation pulse, as shown in FIG. 5 which plots frequency versus lateral distance from the NMR sensor. The resonance frequency of nuclear spins $f_0$ is proportional to the local $B_0$ magnetic field strength through the gyromagnetic ratio γ, a coefficient unique to each nucleus; for example, for $^1H$ (proton), γ/2π=4258 Hz/G. The depth of investigation (DOI) is determined by the frequency of the excitation pulse $f_{rf}$, such that $f_{rf}=f_0=\gamma B_0$ is satisfied. The thickness of the sensitive region is determined by the $B_0$ gradient and the bandwidth of the excitation pulse, the latter of which is proportional to $B_1$.

FIG. 6 schematically depicts an LWD NMR tool configuration located in a borehole and illustrating lateral tool motion. The sensitive region (the measurement interrogation region) is usually a thin cylindrical shell or a set of concentric shells as depicted. The radial thickness of the sensitive region (out into the formation in a direction orthogonal to the axis of the tool string) is generally only a few millimeters to one centimeter. This thin measurement region (sensitive region) and the inherent heterogeneity of the generated $B_0$ field causes the NMR measurements to be particularly susceptible to lateral tool motion.

For example, lateral motion of the NMR logging tool by a sizeable fraction of the thickness of the sensitive region during an NMR measurement (which commonly has a duration of a few seconds) causes nuclear spins excited at the beginning of the NMR measurement to move out of sensory range of the NMR sensor. Stated another way, the formation volume within the sensitive region changes with time during the measurement (owing to tool motion), thereby introducing additional signal decay and a corresponding decrease in the measured $T_2$. Increasing tool displacement (e.g., lateral displacement) increases the amount of signal decay and the $T_2$ measurement error.

The drilling process may also induce complex motion at the NMR sensor, which in turn causes a fluctuation in the magnetic field $B_0$ experienced by spins at a given location in the formation. Such $B_0$ fluctuation causes $f_0$ fluctuation (since $f_0=\gamma B_0$), thereby causing spin dephasing and a reduction of signal amplitude (and hence the estimated/measured porosity). This dephasing effect is proportional to the rate of $B_0$ variation, hence the speed of motion for a given tool.

Figure 7A:
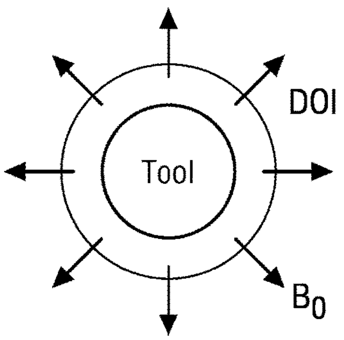
FIGS. 7A and 7B (collectively FIG. 7) schematically depict a cross section of an NMR tool having an azimuthally uniform $B_0$ field (7A) and an azimuthally non-uniform $B_0$ field (7B).
Figure 7B:
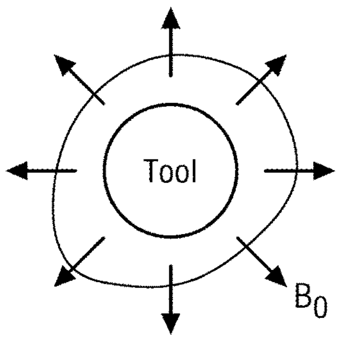

FIGS. 7A and 7B depict schematic NMR tool embodiments including an azimuthally symmetric $B_0$ (7A) and an azimuthally asymmetric $B_0$ (7B). In tool embodiments in which $B_0$ is azimuthally asymmetric (e.g., as in FIG. 7B), rotation of the drill string to drill may introduce $B_0$ fluctuation (even when the tool's center of mass remains at the same position in the borehole). This effect may be particularly problematic in the presence of stick slip (rotational oscillation) which is known to produce instantaneous drill string rotation speeds many times that of the nominal rotation speed at the surface. In stick/slip conditions, a portion of the drill string or drill bit sticks to the borehole wall due to frictional forces often causing the drill string to temporarily stop rotating. Meanwhile, the rotary table continues to turn resulting in an accumulation of tensional energy in the drill string. When the torsional energy exceeds the static friction between the drill string and the borehole, the energy is released suddenly in a rapid burst of drill string rotation. Such rapid rotation may cause significant dephasing depending on the degree of azimuthal non-uniformity in the $B_0$ field.

To mitigate the risk of motion-compromised NMR measurements, certain LWD NMR tools are equipped with motion sensors to detect problematic motion in real-time. A motion sensor package may include, for example, a set of accelerometers that are arranged to measure lateral displacement of the tool and to cancel rotational and gravitational acceleration. However, estimating NMR data quality based on such accelerometer measurements is prone to difficulty.

For example, motion-induced error may be related to the speed (v) and the displacement amplitude (dx) of the motion. Obtaining speed and displacement amplitude values from accelerometer data requires single- and double-integration of the measured acceleration. The obtained speed and displacement values are therefore prone to increasing errors with time (owing to integration drift). Moreover, owing to the strict space constraints on LWD tools, the motion sensors are commonly positioned several feet or even tens of feet away from the NMR sensor (up or down the string). Therefore, the speed and displacement amplitude measured at the motion sensor are not necessarily the same as that experienced by the NMR sensor.

The disclosed embodiments include methods for evaluating drilling dynamics data to determine the quality of corresponding NMR data. The drilling dynamics data may include, for example, lateral acceleration (acceleration orthogonal to the tool axis), axial acceleration, tangential (rotational) acceleration, weight-on-bit (WOB), torque on bit, drill string rotation rate (RPM), shock and vibration, and bending moment. These measurements or a subset of the measurements are commonly available on various tools including such dynamics measurement sensors, such as OptiDrill® available from Schlumberger Technology Corporation. Such measurements may alternatively (or additionally) be integrated into the NMR tool to minimize the distance from the NMR sensor and also to provide NMR-specific drilling dynamics measurements.

Figure 8:
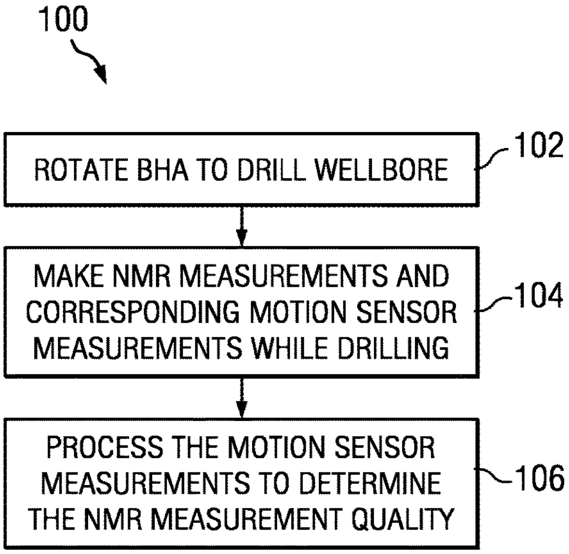
FIG. 8 depicts a flow chart of one example method for determining NMR measurement quality.

FIG. 8 depicts a flow chart of one disclosed method 100 for evaluating or estimating NMR data quality. A bottom hole assembly (BHA) is rotated in a wellbore to drill at 102. The BHA includes an NMR tool and one or more motion sensors (e.g., a set of dynamics sensors) axially spaced apart from one another in the BHA. As described above with respect to FIG. 1 the motion sensors may be deployed in an MWD tool 60 or elsewhere in the BHA 80. The motion sensors may include, for example, accelerometers, magnetometers, gyroscopes, and/or strain gauges. NMR measurements and corresponding motion sensor (dynamics) measurements are made while drilling at 104. The dynamics measurements are processed at 106 to determine a quality of the NMR measurements. As described in more detail below, the method 100 may further include processing historical data (or previously generated data) to determine a correlation relating the motion measurements to NMR data quality and then applying the correlation to the motion sensor measurements made in 104 to determine the quality of NMR measurements made in 104.

The NMR measurements made at 104 may include substantially any suitable NMR measurements, for example, including $T_2$ measurements, and/or NMR porosity measurements as described above (which tend to be most sensitive to motion of the NMR tool in the wellbore). The same set of drilling dynamics data or different sets of drilling dynamics data may be used to estimate porosity data quality and $T_2$ data quality. As noted above the correlation relating drilling dynamics and NMR data quality differs for porosity and $T_2$ NMR data. Therefore, even when the same set of drilling dynamics measurements are provided, different correlation functions may be used to estimate porosity data quality and $T_2$ data quality.

NMR data quality may be defined in multiple ways. In some embodiments, a threshold or a set of thresholds may be used to classify NMR data quality into different categories. For example, a permissible error (e.g., 5%) for a given NMR measurement may be used as a threshold. If motion-induced error is less than the threshold, the data is considered acceptable. If motion-induced error is greater than the threshold, the data is considered motion-affected. In some embodiments, more categories may be defined, such as moderately affected by motion (e.g., a motion induced error between 5 and 10%) and highly affected by motion (e.g., a motion induced error greater than 10%).

In some embodiments, NMR data quality may be given on a continuous scale. For example, a ratio of measured porosity to true porosity (or porosity error to true porosity) or the difference between true $T_2$ and measured $T_2$ may be used as a continuous (instead of categorized) data quality. The drilling dynamics measurements, drilling dynamics indicators, or motion properties derived from those measurements may then be correlated with this amount of error.

Figure 9:
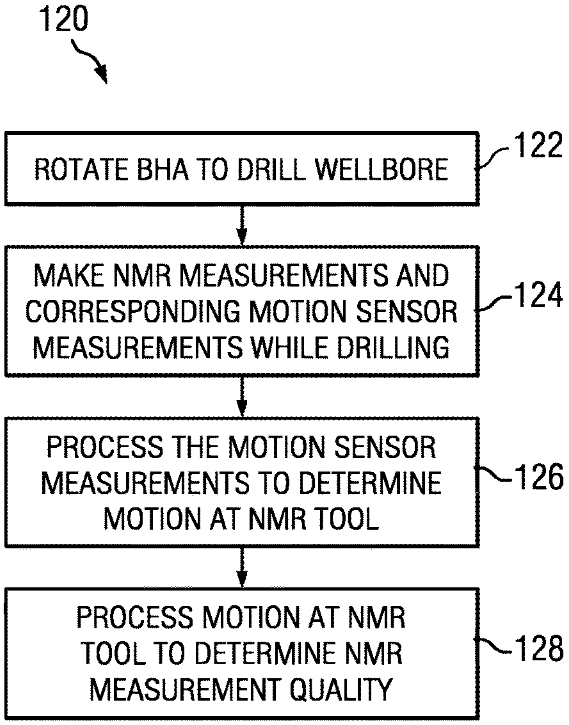
FIG. 9 depicts a flow chart of another example method for determining NMR measurement quality.

FIG. 9 depicts a flow chart of a method 120 for estimating NMR data quality according to some embodiments. As described above with respect to FIG. 8, a BHA is rotated in a wellbore to drill at 122. The BHA includes a motion sensor located at a first axial location and an NMR sensor located at a second axial location in the BHA. NMR measurements and corresponding motion (dynamics) measurements are made while drilling at 124. The dynamics measurements (which are made at the first location) are processed at 126 to determine motion of the NMR tool at the second location. The NMR data quality is then determined at 128 from the motion of the NMR tool determined at 126. As described in more detail below, method 120 may further include determining a correlation relating motion at the motion sensor and motion at the NMR tool.

With continued reference to FIG. 9, it will be appreciated that the motion between the set of dynamics sensors and the NMR tool may be considered linked (or coupled) when the motion sensor and the NMR tool are located in close proximity to one another. For example, when the motion sensor and the NMR sensor (which are located at the first and second sensor locations) are deployed between common stabilizers they tend to experience the same mode of motion (e.g., forward whirling, backward whirling, lateral vibration, etc.). The velocity and displacement amplitude tend to differ depending on the relative distances to the stabilizers (which may act as pivot points on a bending drill string). A correlation function may be obtained to estimate the motion at the NMR tool based on the drilling dynamics measurements at the motion sensor.

With continued reference to FIGS. 8 and 9, the motion sensors may include substantially any suitable motion sensors, for example, including accelerometers, magnetometer, gyroscopes, strain gauges and the like. The motion sensors may be deployed in a measurement while drilling tool and may be configured, for example, to measure axial and transverse shock, axial and transverse acceleration, radial acceleration, tangential acceleration, downhole rotation rate, weight on bit, torque on bit, axial and transverse bending, and axial and transverse magnetic field, bit bounce severity, stick slip severity, a bending moment of the BHA, and various other indicators of drilling string displacement, velocity, and acceleration while drilling (drilling dynamics).

Figure 10A:
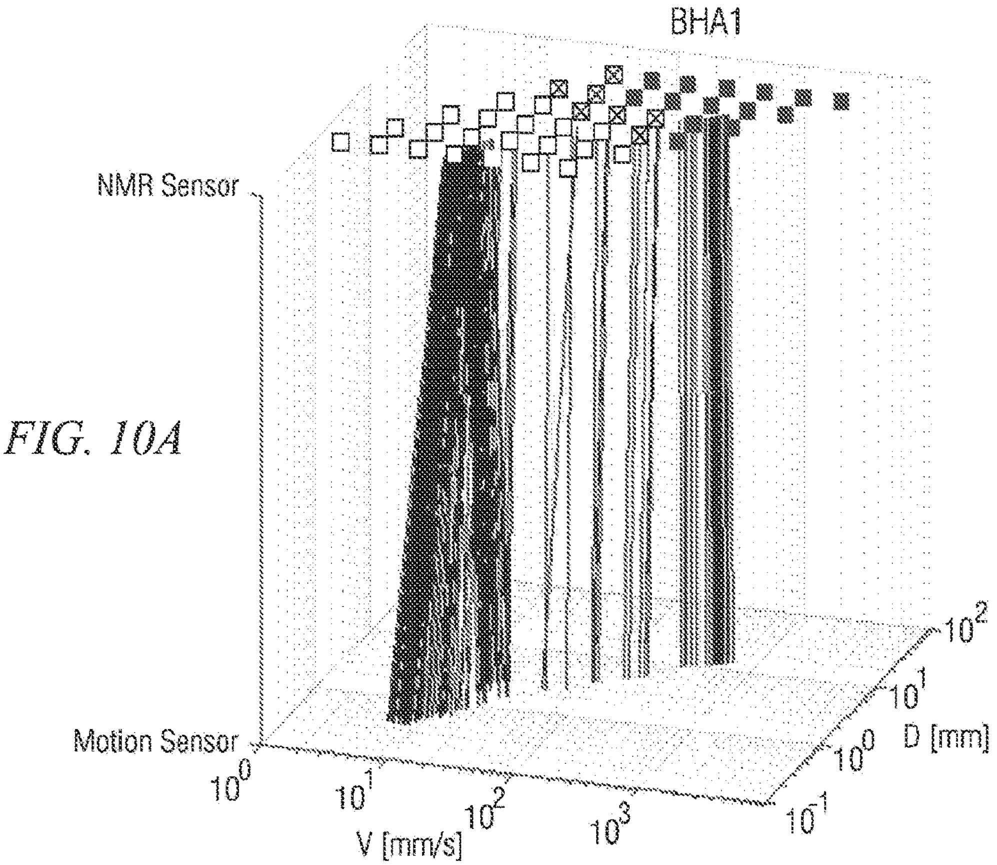
FIGS. 10A and 10B (collectively FIG. 10) depict example correlations relating motion at a motion sensor and motion at an NMR tool/sensor in corresponding first and second BHA configurations.
Figure 10B:
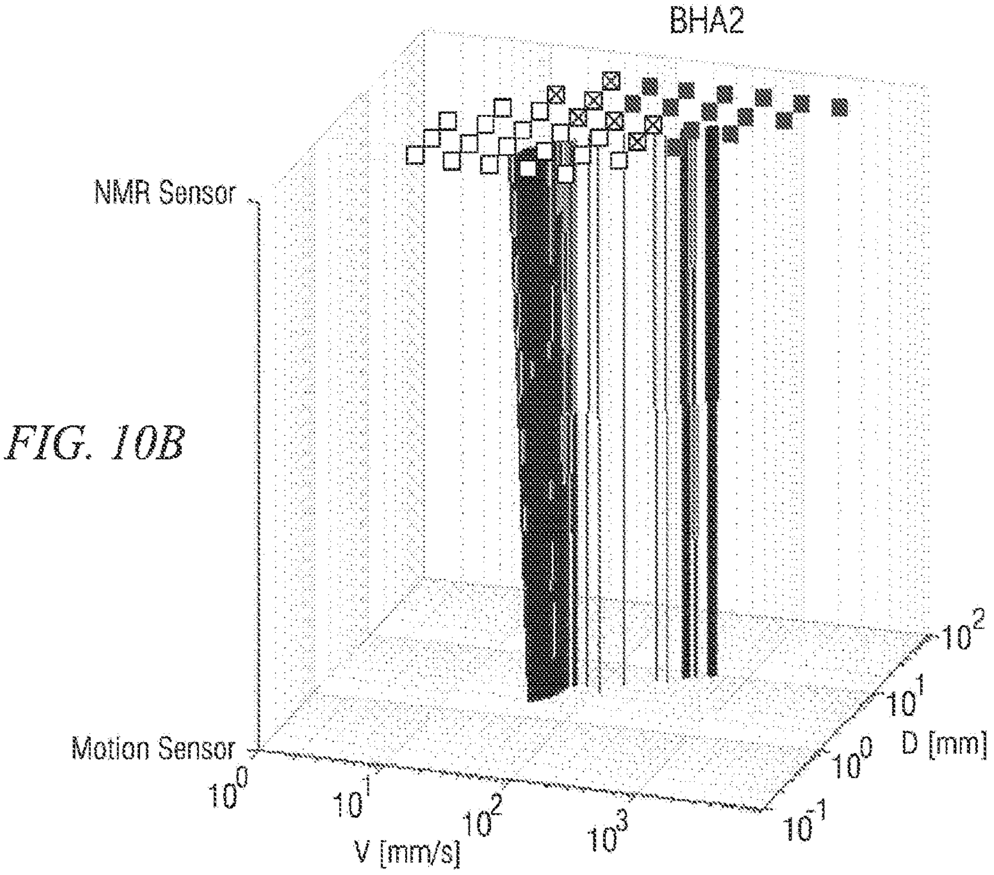

FIGS. 10A and 10B depict one example correlation relating motion at the motion sensor and motion at the NMR tool for corresponding first (10A) and second (10B) BHA configurations. In each depiction, the lower panel plots the motion (speed and displacement in this example) at the motion sensor and the upper panel plots motion (speed and displacement in this example) at the NMR tool. The lines connecting the corresponding plotted points indicate the correlation between the two locations. In FIG. 10A, motion at the NMR sensor (the upper panel) is amplified with respect to the measured motion at the motion sensor (the lower panel). Note that the correlation lines are slanted towards larger velocity and displacement values in the upper panel. In FIG. 10B, motion at the NMR sensor (the upper panel) is similar to that at the motion sensor (the lower panel). Note the vertical correlation lines between the panels.

The example correlations depicted on FIGS. 10A and 10B were obtained using the drilling dynamics simulation platform IDEAS® which is available from Schlumberger. The IDEAS platform takes the BHA configuration, well bore trajectory, rock properties, and drilling parameters (such as WOB and surface RPM) as input and outputs acceleration, velocity, and displacement at arbitrary positions along the BHA. Simulating multiple scenarios characterized by the combinations of above input parameters enabled the motion correlations depicted on FIGS. 10A and 10B to be determined.

The aforementioned drilling dynamics simulation may be calibrated, for example, with field data. The BHA configuration, well bore trajectory, rock properties, and drilling parameters used in the field may be input into the drilling dynamics simulator to replicate the drilling operation. The resulting motion simulated at the motion sensor may then be compared with the actual measured motion (e.g., including measured axial, lateral, and tangential accelerations, downhole RPM, and the type and the severity of whirling). The simulation parameters (such as the friction factor that defines the interaction between the tool surface and the borehole wall) may then be adjusted to obtain a fit between the simulated and actual motion.

Upon determining the speed and displacement amplitude of motion at the NMR sensor (e.g., via correlation with measurements made at motion sensors as described above), the speed and displacement amplitude may be used to estimate the NMR data quality. For example, as described in more detail in commonly assigned U.S. Pat. No. 11,091,997 (which is incorporated by reference in its entirety herein), the NMR data quality may be estimated by correlating the velocity and displacement amplitude with an estimated motion induced signal loss. The estimated motion induced signal loss may be obtained by generating an estimated NMR measurement quality map that provides an estimate of the NMR measurement quality as a function of the velocity and displacement amplitude. FIGS. 10A and 10B depict examples with coded squares; light gray corresponding to porosity measurements that satisfy the accuracy requirement (less than 5% error in this example), dark gray corresponding to porosity measurements that have a motion induced error between 5% and 10%, and black corresponding to porosity measurements that have motion induced errors greater than 10%.

Figure 11:
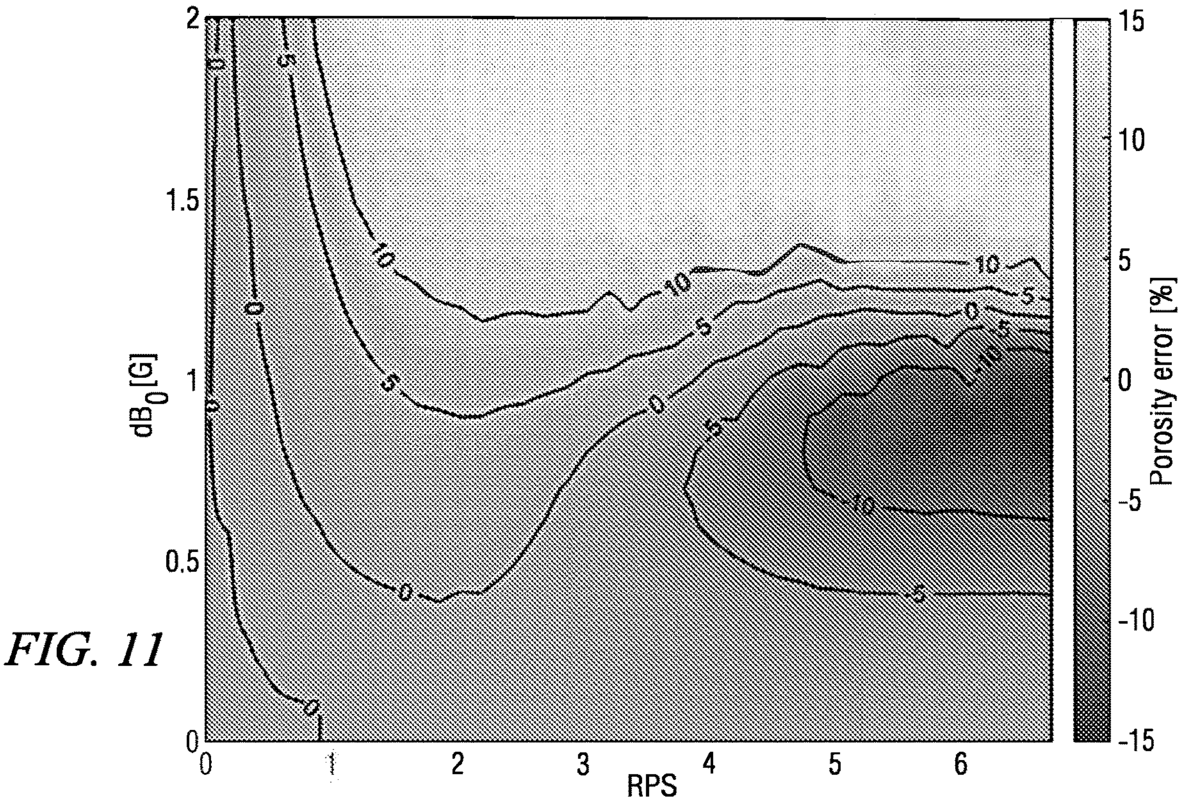
FIG. 11 depicts a contour plot of NMR porosity error with azimuthal magnetic field variation $dB_0$ on the vertical axis and downhole rotation rate in units of revolutions per second on the horizontal axis.

FIG. 11 depicts a contour plot of azimuthal magnetic field variation $dB_0$ on the vertical axis and downhole rotation rate (RPS) in units of revolutions per second on the horizontal axis. The estimated porosity error is color coded with large positive errors being colored light gray or white, large negative errors being colored dark gray or black and small errors being colored lighter shades of gray.

Figure 12:
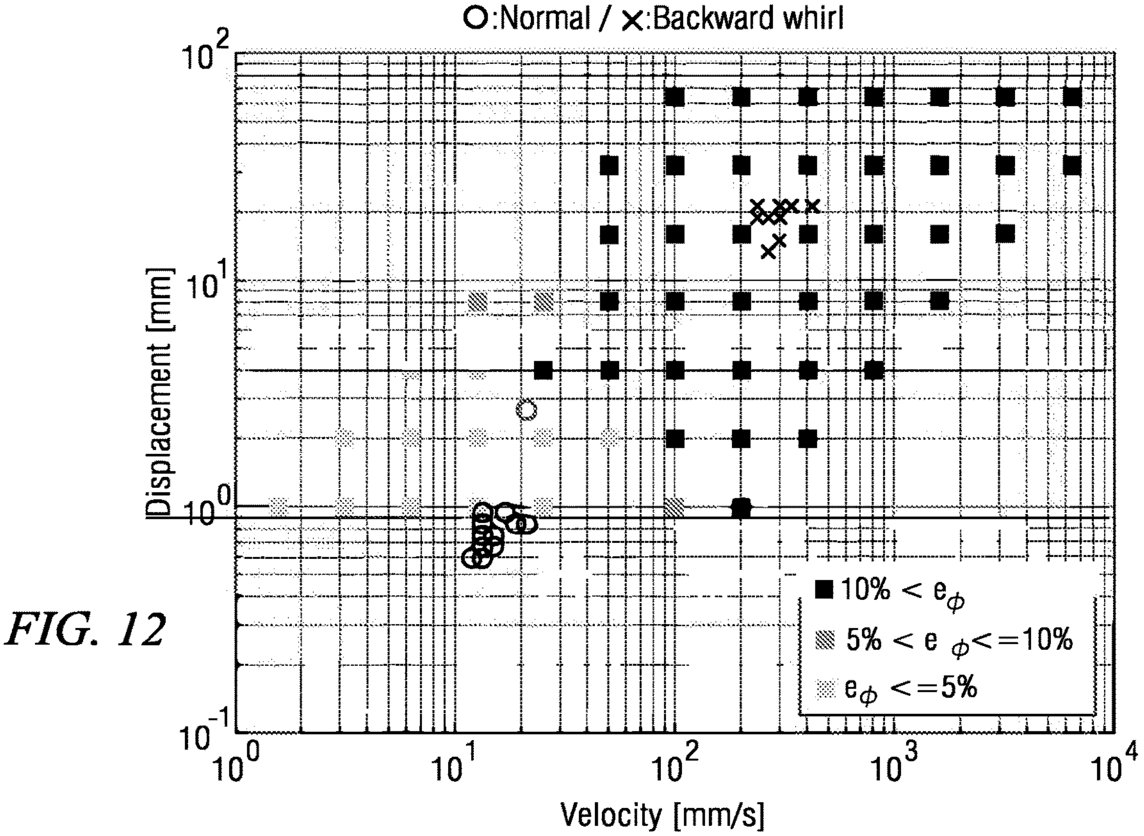
FIG. 12 depicts a correlation between whirl type and color coded porosity error in a background plot of displacement amplitude in units of millimeters versus velocity in units of millimeters per second on a log log scale.

FIG. 12 depicts a plot of displacement amplitude in units of millimeters versus velocity in units of millimeters per second on a log log scale. FIG. 12 is similar to the top and bottom panels in FIGS. 10A and 10B. In FIG. 12 a set of drilling dynamics indicators may be computed from measured motion sensor data and used to estimate NMR data quality. The drilling dynamics indicators may include, for example, whirl type, whirl severity, bit bounce, axial vibration energy, lateral vibration energy, torsional vibration energy, and stick-slip. In FIG. 12, a clear correlation is observed between whirl types and porosity error with normal drilling (circles) resulting in minimal error (good NMR data quality) and backward whirl (Xes) resulting in larger errors.

Certain commercial tools (e.g., Schlumberger's OptiDrill) compute the above listed indicators downhole to translate raw measurements (e.g., axial/lateral/tangential accelerations and rotation speeds) into information that can be efficiently transmitted to the surface with limited bandwidth for real-time display. These computed indicators may then be used to determine the NMR data quality uphole or downhole. For example, the downhole firmware running on the NMR tool may be configured to estimate NMR data quality based on these drilling dynamics indicators.

With continued reference to FIGS. 10-12, it will be understood that when the number of dynamics indicators is small (e.g., 2 or 3) as shown in the above examples, the resulting NMR data quality may be obtained through a look-up table with those parameters (e.g., velocity and displacement amplitude or RPM and $dB_0$) as the reference index. The NMR data quality may also be determined using a mathematical function (such as a polynomial function) that fits the correlations relating measured dynamics indicators (e.g., velocity and displacement amplitude or RPM and $dB_0$) and NMR data quality (e.g., porosity, $T_2$).

Figure 13:
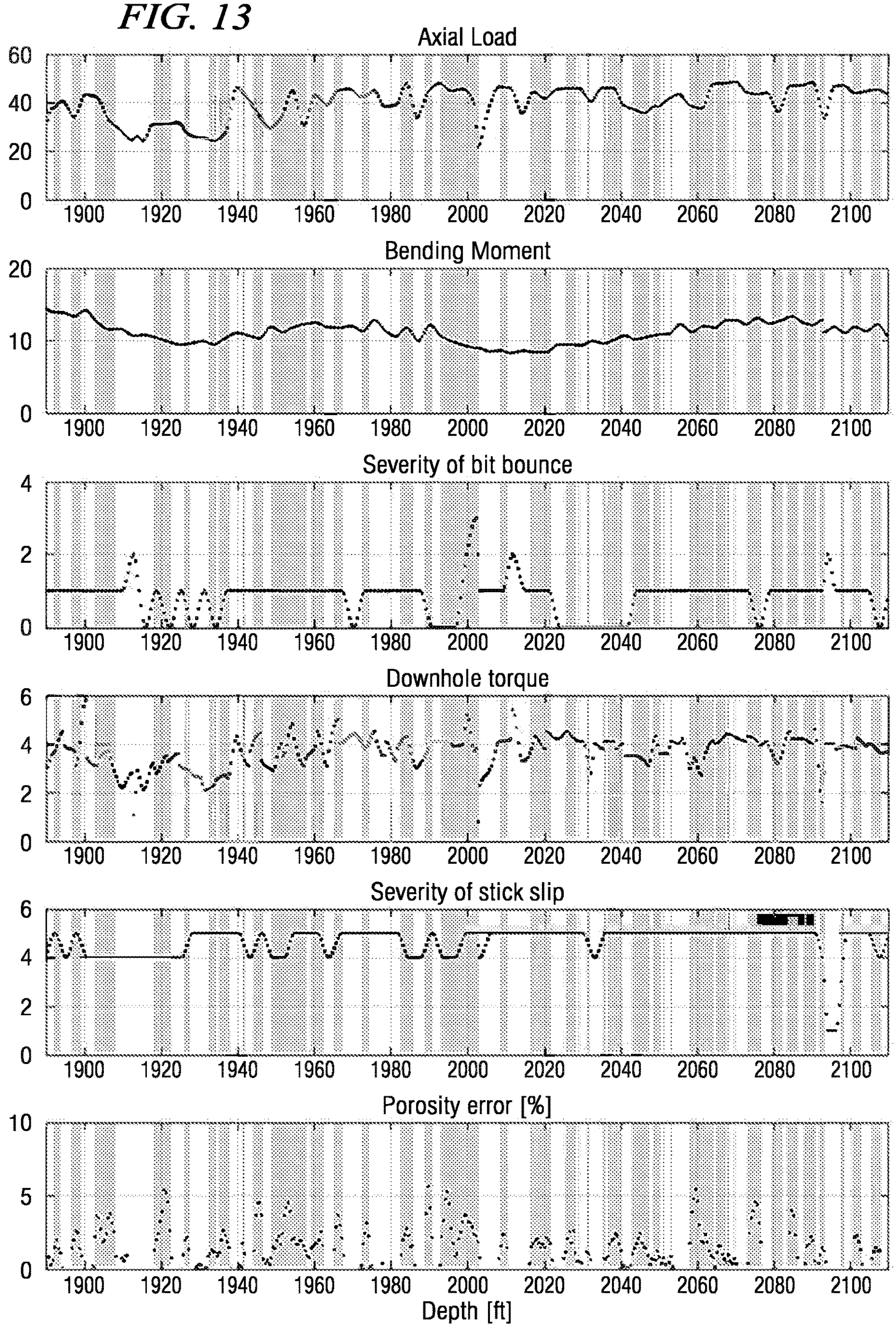
FIG. 13 depicts plots of five distinct dynamics indicators obtained from the motion measurements (namely axial load, bending moment, bit bounce severity, downhole torque, and stick slip severity) along with a porosity error versus measured depth.

With reference again to FIG. 8, drilling dynamics measurements (motion measurements) made at the motion sensor may be correlated directly with NMR data quality based on predetermined correlations relating the quantities (between dynamics measurements and the NMR data quality). FIG. 13 depicts plots of five distinct dynamics indicators obtained from the motion measurements (namely axial load, bending moment, bit bounce severity, downhole torque, and stick slip severity) along with a porosity error versus measured depth. The shaded sections indicate the depths with a signature of problematic motion. The bottom row is actual porosity error observed under given motion, showing good agreement with the shaded sections inferred from the drilling dynamics parameters.

Unlike some embodiments that utilize only a few parameters (e.g., velocity and displacement amplitude or RPM and $dB_0$) to estimate NMR data quality, it is difficult to describe such a multi-variate correlation (as depicted on FIG. 13) with a simple look-up table. In various disclosed embodiments, a supervised machine learning model may be used to map the drilling dynamics parameters to the response of the system (e.g., porosity error). Such a supervised learning model may be trained in various ways.

For example, in some embodiments, both drilling dynamics parameters and corresponding NMR data may be obtained from actual tool operations (e.g., as shown on FIG. 13). In this example, a supervised machine learning model was trained by using two measurement passes: a drilling pass with severe motion and a sliding pass with benign motion (e.g., while tripping the BHA out of the well). A motion flag computed from the porosity difference between the two passes was used to find a signature of problematic motion in the drilling dynamics parameters. Separately, the same drilling dynamics parameters measured during the sliding pass were marked as a signature of non-problematic motion. Based on these two datasets, the model was trained to flag problematic motion that would cause porosity deficit (error). While not depicted on FIG. 13, the same process may be implemented to identify $T_2$ error. The resulting correlation will differ since $T_2$ is impacted by different modes of motion than porosity (as described above).

In some embodiments, the training may be performed by using well-established NMR spin dynamics simulations and the drilling dynamics simulation mentioned above. For each drilling condition, motion at the motion sensor and the motion at the NMR sensor are computed. The former is transformed into corresponding sensor readings, such as modeled acceleration and rotation measurements. The latter is used to compute the behavior of NMR signal under the given motion, from which the induced porosity error and $T_2$ error may be computed. This process may be repeated while changing drilling parameters and rock properties to cover a wide range of scenarios expected in downhole operations. Then resulting pairs of drilling dynamics measurements and corresponding NMR data quality are used to train the supervised learning model in the same way as the previous embodiment. In embodiments in which the NMR data quality is categorized into a finite number of categories, such as good, caution, and bad (green, yellow, and red), this process is considered a classification problem. In embodiments in which the NMR data quality is measured with a continuous scale, such as the amount of porosity or $T_2$ error, this process is considered a regression problem.

Figure 14:
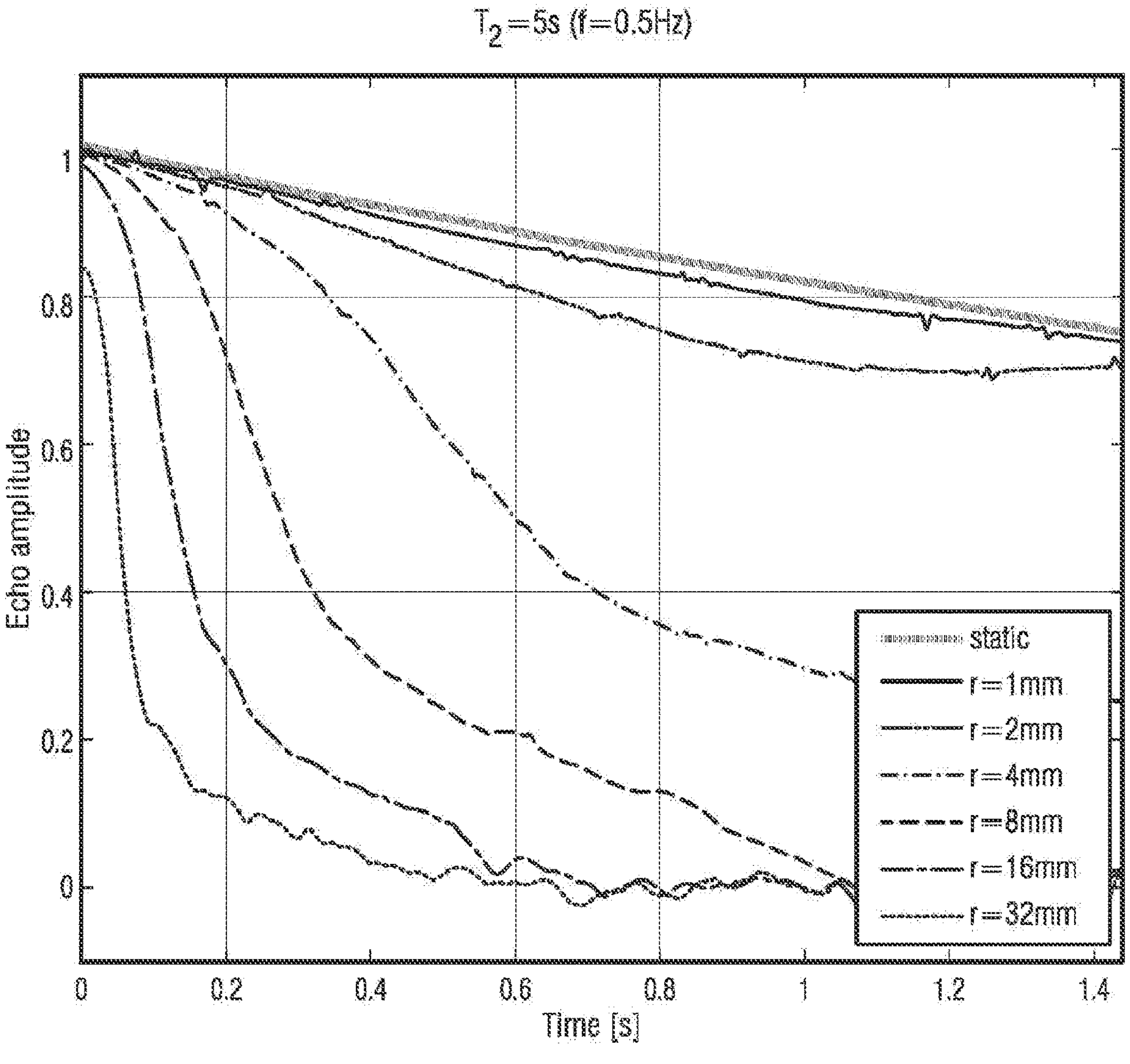
FIG. 14 depicts a plot of echo amplitude on the vertical axis versus time on the horizontal axis for a simulated NMR measurement made under circular motion at distinct amplitudes.

FIG. 14 depicts a plot of echo amplitude on the vertical axis versus time on the horizontal axis for a simulated NMR measurement made under circular motion at distinct amplitudes. The motion induced signal decay was observed to increase with amplitude of the circular motion (which is expressed as a radius r as given in the legend). For the largest amplitude motion, the initial echo was reduced by 17%, corresponding to a porosity error.

It will be appreciated that the correlation relating motion at the motion sensor and the motion at the NMR sensor depends on both the relative positions of those two locations (e.g., with respect to stabilizers in the BHA) and the configuration of the BHA (such as the type of drill bit, the type and sequence of tools deployed in the BHA, and whether or not other tools are deployed between the motion sensor and the NMR tool). On the other hand, the correlation relating the motion at the NMR tool (e.g., at the antenna) and resulting NMR data quality is generally independent of the BHA configuration and depends primarily on the configuration of the NMR tool and measurement protocol (the pulse sequence). Based on the foregoing, the above model can be split into first and second parts, the first part correlating motion at the motion sensor with motion at the NMR tool and the second part correlating motion at the NMR tool with NMR data quality.

In embodiments in which the model includes first and second parts (as described above), the first part of the model (describing the correlation relating the motion at the motion sensor and the motion at the NMR sensor) may be trained for each BHA configuration (or for each set of similar configurations). Likewise, the first part of the model is trained for the particular configuration of sensors used in the motion sensor. For example, different tools with drilling dynamics sensors, such as OptiDrill (available from Schlumberger), have different sets of motion sensors located at different positions with respect to the connection point to the NMR tool. This requires the model to be trained for each tool (and its unique configuration of motion sensors). The second part of the model (describing the correlation relating the motion at the NMR sensor and NMR data quality) may be shared among different BHA configurations as long as they utilize the same NMR tool and the same NMR pulse sequence.

With reference to the foregoing embodiments, it will be appreciated that the model may be trained using various machine learning techniques. By machine learning it is meant that the network architecture and/or the correlations relating the motion at the motion sensor and the motion at the NMR tool, the motion at the NMR tool and the NMR data quality, and/or the motion at the motion sensor and the NMR data quality may be partially or completely learned by a machine learning algorithm. In general, a machine learning algorithm requires training data (e.g., a number of inputs that have been designated to belong to a specific class). For example, this data may include motion data at the motion sensor and corresponding NMR porosity or $T_2$ errors. This approach may be suitably appropriate if there is no knowledge about the dependencies variables available.

It will be appreciated that the supervised machine learning model may be refined over time. For example, NMR measurements and corresponding motion sensor measurements made over a period of time and in a number of wellbores penetrating various formations may be accumulated and stored in a database. These accumulated measurements may be processed from time to time to further train and refine the supervised machine learning model. The database of accumulated measurements may also be combined with simulated measurements obtained using the modeling techniques described herein.

Further implementations may employ a combination of expert driven and machine learning algorithms. In such a combined approach, the expert of the domain may model network architecture (i.e., the dependencies of the variables), The probabilities of the dependencies may then be learned from training data with a machine leaning algorithm. Such combined approaches may be suitably appropriate when the dependencies of the variables are known, but the exact probabilities are not explicit.

The above described machine learning algorithms may be applied to the first part of the model, the second part of the model, or the full model (e.g., correlating the motion at the motion sensor with the NMR data quality).

With reference again to FIGS. 8 and 9, methods 100 and 120 may further include a mitigation to compensate for the NMR data quality (or lack thereof). In the following examples, NMR porosity measurements are used to exemplify such mitigation. Of course, it will be understood, that the disclosed embodiments are also applicable to $T_2$ measurements which will include a different correlation relating the drilling dynamics measurements made at the motion sensor and the NMR data quality.

For example, if the measured NMR porosity is above the noise level but the trained model indicates that the measurement was affected by motion, the drilling operator may elect to change various drilling parameters, such as WOB and surface RPM, to reduce the severity of the dynamics (tool motion). In some embodiments, the section of the wellbore affected by tool motion may logged again with reduced motion, for example, in a second pass such as a sliding pass, or reaming pass, or a tripping pass (i.e., when not drilling).

In some embodiments, if measured NMR porosity is below the noise level but the trained model indicates that the measurement was affected by motion, the drilling operator may compare the NMR porosity measurements with other (non-NMR) porosity measurements (e.g., obtained from neutron or density logs). If the NMR and non-NMR porosity measurements compare unfavorably (e.g., the NMR porosity is low and the non-NMR porosity is high) the drilling operator may elect to log the affected section of the wellbore again as described above. If the NMR and non-NMR porosity measurements compare favorably the drilling operator may elect not to relog the motion affected section of the wellbore.

In yet another example, if the measured NMR porosity is above the noise level but the trained model suggests that the measurement was not compromised by motion, then there is no need to change drilling parameters nor to log the same section again.

It will be understood that the various techniques described above and relating to the processing of NMR measurements for motion correction are provided as example embodiments. Accordingly, it should be understood that the present disclosure should not be construed as being limited to only the examples provided above. Further, it should be appreciated that the NMR processing techniques disclosed herein may be implemented in any suitable manner, including hardware (suitably configured circuitry), software (e.g., via a computer program including executable code stored on one or more tangible computer readable media), or via using a combination of both hardware and software elements.

Further, it will be understood that the various NMR motion-correction techniques described may optionally be implemented on a downhole processor (e.g., a processor that is part of an NMR logging tool) with the results sent to the surface by any suitable telemetry technique. In some embodiments, a portion may be performed uphole and a portion may be performed on the downhole processor. For example, the algorithm may be trained at the surface using a surface computer to process motion sensor data and NMR logging data and thereby develop the above described correlation(s). The correlation may then be programmed into downhole software and/or firmware and used by the downhole processor to evaluate NMR logging data in substantially real time while drilling.

The present disclosure may be embodied in other specific forms without departing from its spirit or characteristics. The described embodiments are to be considered as illustrative and not restrictive. Changes that come within the meaning and range of equivalency of the claims are to be embraced within their scope.

What is claimed is:

1. A method for evaluating logging while drilling (LWD) nuclear magnetic resonance (NMR) measurement quality, the method comprising:

stabilizing a bottom hole assembly (BHA) in a wellbore of a formation via a first stabilizer and a second stabilizer spaced apart axially along the BHA;

logging a section of the wellbore by:

rotating the BHA in the wellbore to drill, the BHA including an NMR tool deployed at a first location between the first stabilizer and the second stabilizer and at least one a motion sensor deployed at a second location between the first stabilizer and the second stabilizer, wherein the first location and the second location are axially spaced apart in the BHA; and making NMR measurements and corresponding motion sensor measurements while drilling in the wellbore;

calculating an error associated with the NMR measurements based on the corresponding motion sensor measurements;

in response to the error indicating the NMR measurements are affected by a motion of the NMR tool, changing one or more drilling parameters of the BHA to generate one or more new drilling parameters;

re-logging the section of the wellbore using the one or more new drilling parameters;

reducing a severity of the motion to produce a reduced motion of the NMR tool by applying the one or more new drilling parameters;

wherein the re-logging comprises executing at least one of a sliding pass, a reaming pass, or a tripping pass of the NMR tool through the section of the wellbore using the reduced motion.

2. The method of claim 1, further comprising:

processing historical data or simulated data to determine a correlation relating BHA motion at the motion sensor and the error.

3. The method of claim 2, wherein the processing further comprises applying the correlation to the corresponding motion sensor measurements to determine the error.

4. The method of claim 3, wherein the correlation is determined using a supervised machine learning model to map the BHA motion at the motion sensor to the error.

5. The method of claim 4, wherein the NMR measurements comprise NMR porosity and transverse relaxation time $T_2$.

6. The method of claim 4, wherein the motion sensor is configured to measure at least one of axial and transverse shock, axial and transverse acceleration, radial acceleration, tangential acceleration, downhole rotation rate, weight on bit, torque on bit, axial and transverse bending, and axial and transverse magnet field, bit bounce severity, stick slip severity, or a bending moment of the BHA.

7. The method of claim 4, wherein the supervised machine learning model is trained by correlating NMR measurements made in two distinct measurement passes in the formation, the two distinct measurement passes comprising a first measurement pass made while drilling and a second measurement pass made while sliding.

8. The method of claim 4, wherein the supervised machine learning model is trained by correlating modeled NMR measurements and modeled BHA motion measurements, the modeled NMR and BHA motion measurements obtained using NMR spin dynamics simulations and drilling dynamics simulations.

9. The method of claim 8, wherein the drilling dynamics simulations are used to simulate the motion of the NMR tool based on the corresponding motion sensor measurements and the NMR spin dynamics simulations are used to simulate the error based on the simulated motion at the NMR tool.

10. The method of claim 4, further comprising:

repeating the rotating and the making measurements in a plurality of different wellbores;

accumulating the NMR measurements and the corresponding motion sensor measurements made while the repeating in a database; and processing the measurements in the database to train and refine the supervised machine learning model.

11. The method of claim 1, wherein the calculating the error comprises:

processing motion sensor measurements made at the second location to determine a motion of the NMR tool at the first location; and processing the motion of the NMR tool at the first location to determine the error.

12. The method of claim 11, further comprising determining a correlation relating a sensor motion at the motion sensor and the motion of the NMR tool.

13. The method of claim 12, wherein processing the sensor motion comprises processing the corresponding motion sensor measurements with the correlation to compute the motion of the NMR tool.

14. The method of claim 12 wherein the correlation relates a speed and a displacement amplitude of the sensor motion to a speed and a displacement amplitude of the motion of the NMR tool.

15. The method of claim 14, wherein the calculating the error comprises processing the speed and the displacement amplitude of the motion of the NMR tool to determine the error.

16. The method of claim 12, further comprising calibrating the correlation using at least one of historical data or simulated data.

17. A nuclear magnetic resonance (NMR) logging while drilling (LWD) tool comprising:

an LWD tool having an LWD tool body;

a first stabilizer;

a second stabilizer;

at least one permanent magnet deployed in the LWD tool body, the permanent magnet configured to generate a $B_0$ magnetic field radially outward from the LWD tool body;

at least one antenna deployed in the LWD tool body, the antenna configured to generate a radio frequency $B_1$ magnetic field radially outward from the LWD tool body and to measure echo amplitudes corresponding to a transmitted $B_1$ pulse; and a processor configured to:

stabilize the LWD tool body in a wellbore of a formation via the first stabilizer and the second stabilizer;

log a section of the wellbore by:

rotating the LWD tool body in the wellbore, wherein the LWD tool comprises the at least one antenna deployed at a first location between the first stabilizer and the second stabilizer and a motion sensor deployed at a second location between the first stabilizer and the second stabilizer, wherein the first location and the second location are axially spaced apart along the LWD tool body; and making NMR measurements, via the at least one antenna, and corresponding motion sensor measurements while drilling in the wellbore;

calculate an error associated with the NMR measurements based on the corresponding motion sensor measurements;

in response to the error indicating the NMR measurements are affected by a motion of the at least one antenna, change one or more drilling parameters of the LWD tool to generate one or more new drilling parameters;

re-log the section of the wellbore using the one or more new drilling parameters; and reduce a severity of the motion to produce a reduced motion of the LWD tool body by applying the one or more new drilling parameters;

wherein the re-logging comprises executing at least one of a sliding pass, a reaming pass, or a tripping pass of the LWD tool through the section of the wellbore using the reduced motion.

18. A bottom hole assembly (BHA) comprising:
a first stabilizer;
a second stabilizer;
a nuclear magnetic resonance (NMR) logging while drilling tool deployed at a first axial location in the BHA between the first stabilizer and the second stabilizer;
a motion sensor deployed at a second axial location in the BHA between the first stabilizer and the second stabilizer, wherein the first axial location and the second axial location are axially spaced apart; and
a processor configured to:
stabilize the BHA in a wellbore of a formation via the first stabilizer and the second stabilizer;
log a section of the wellbore by:
rotating the BHA in the wellbore; and
making NMR measurements, via the NMR logging while drilling tool, and corresponding motion sensor measurements while drilling in the wellbore;
calculate an error associated with the NMR measurements based on the corresponding motion sensor measurements;
in response to the error indicating the NMR measurements are affected by a motion of the NMR logging while drilling tool, change one or more drilling parameters of the BHA to generate one or more new drilling parameters;
reduce a severity of the motion to produce a reduced motion of the NMR logging while drilling tool by applying the one or more new drilling parameters; and
re-log the section of the wellbore using the one or more new drilling parameters, wherein the re-logging includes executing at least one of a sliding pass, a reaming pass, or a tripping pass of the NMR logging while drilling tool through the section of the wellbore using the reduced motion.

19. The BHA of claim 18, wherein the processor is further configured to:
calculate a correlation relating a sensor motion of the motion sensor to the error; and
apply the correlation to the corresponding motion sensor measurements to determine the error.

* * * * *